United States Patent [19]

Kubo et al.

[11] Patent Number: 5,354,476
[45] Date of Patent: Oct. 11, 1994

[54] METHOD OF TREATING WATER

[75] Inventors: Nami Kubo, Otsu; Masaru Noyori, Moriyama; Shigeki Mori, Kusatsu; Tsukasa Ito, Inabe, all of Japan

[73] Assignee: Toray Industries, Inc., Japan

[21] Appl. No.: 989,926

[22] Filed: Dec. 11, 1992

Related U.S. Application Data

[63] Continuation of Ser. No. 646,718, Mar. 11, 1991, abandoned.

[30] Foreign Application Priority Data

May 24, 1989 [JP] Japan ............... 1-130777
Jun. 27, 1989 [JP] Japan ............... 1-164177

[51] Int. Cl.$^5$ ............... C02F 1/42
[52] U.S. Cl. ............... 210/679; 210/686; 210/777; 210/778
[58] Field of Search ............... 210/679, 686, 777, 778, 210/502.1, 505

[56] References Cited

U.S. PATENT DOCUMENTS

| | | | |
|---|---|---|---|
| 3,080,971 | 3/1963 | Hutto et al. | 210/778 |
| 4,007,301 | 2/1977 | De Martino | 210/778 |
| 4,190,532 | 2/1980 | Halbfoster | 210/777 |
| 4,313,832 | 2/1982 | Shimizu et al. | 210/505 |

FOREIGN PATENT DOCUMENTS

| | | |
|---|---|---|
| 709661 | 7/1968 | Belgium . |
| 74221 | 3/1983 | European Pat. Off. . |
| 287917 | 10/1988 | European Pat. Off. . |
| 58-20236 | 2/1983 | Japan . |

OTHER PUBLICATIONS

Abstract No. 93481Q, *Chemical Abstracts*, vol. 99, No. 12 Sep. 12, 1983, Columbus, Ohio, U.S.

*Primary Examiner*—Ivars Cintins
*Attorney, Agent, or Firm*—Austin R. Miller

[57] ABSTRACT

This invention relates to a method for treating water by using a precoated filter.

Since the method of the present invention utilizes ion-exchange fibers having an ion-exchange polymer and a reinforcing polymer as the precoating material together with a cation-exchange resin powder and an anion-exchange resin powder, the method made it possible to prominently prolong the lifetime of the precoating material and to improve the quality of the treated water.

The method for treating water of the present invention is suited for the treatment of water to be used in, or waste water from atomic power plants, steam power plants, pharmaceutical companies and the like.

12 Claims, No Drawings

METHOD OF TREATING WATER

This application is a continuation of application Ser. No. 07/646,718, filed Mar. 11, 1991, now abandoned.

TECHNICAL FIELD

The present invention relates to a method of treating water using a precoated filter. More particularly, the present invention relates to a method of treating water which may be applied to the removal of impurities in water used in atomic power plants, steam power plants and pharmaceutical companies as well as waste water therefrom. It should be noted that the term "water" used herein includes raw water containing small amount of ions and colloids, such as the above-described water and waste water.

BACKGROUND ART

For treating water used in atomic power plants, steam power plants and pharmaceutical companies as well as waste water therefrom, filters of precoated type which comprise ion-exchange resin powder as the precoating material are used. The methods in which water to be treated is passed through a filter layer made of a precoating material precoated on a support so as to remove impurities contained in the water are collectively called precoat filtration. Recently, so called precoated filters comprising ion-exchange powder precoated on a support element by water pressure are used and water to be treated is passed through the precoated layer.

When the difference in the pressure exerted to each side of the filter reaches a prescribed level, the precoating material is removed from the support element by back wash and is replaced with a new one. In most cases, before the entire ion-exchange capacity is fully consumed, the difference in the pressure reaches the prescribed level, so that the time point of the back wash is determined by the pressure difference. In the precoat filtration in atomic power plants, all of the wasted precoating material collected by the back wash must be stored because it contains radioactive substances. Increase in the volume of this radioactive waste presents a new social problem.

It is thus desired to prolong the duration from the precoating of the precoating material to the back wash (water-treatment lifetime of the precoating material) as long as possible. This cannot be attained by merely prolonging the water-treatment lifetime of the precoating material by preventing an increase in the pressure difference of the precoating material because the prolongation of the lifetime of the precoating material is not meaningful unless the quality of the treated water is better than or comparative to that of the water treated by a conventional precoated filter.

If the quality of the treated water is improved, the exposure of the staff working in atomic power plants to radioactivity is largely reduced.

To satisfy these demands, a method was proposed in which ion-exchange fibers are used as the precoating material (Japanese Laid Open Patent Application (Kokai) No. 55-67384). However, the advantageous effect brought about by the ion-exchange fibers is merely to prevent the generation of cracks in the precoating material, so that the above-described tasks are not at all attained by this precoated filter. Further, the quality of the treated water is not at all improved by this precoated filter.

A precoating material made of a mixture of ion-exchange resin powder and ion-exchange fibers consisting of ion-exchange polymer and a reinforcing polymer is disclosed in *Zosuiqijutsu* 14, No. 2, 49 (1988). However, in this reference, a specific combination of the ion-exchange fibers and ion-exchange resin powder, which is very important for the formation of the precoated layer is not disclosed. If a mixture of, for example, a cation-exchange resin powder and anion-exchange fibers, or a mixture of an anion-exchange resin powder and cation-exchange fibers is coated, although the volume of the precoated layer is increased so that the prolongation of the lifetime of the precoating material is attained, the quality of the treated water is degraded. On the other hand, if a mixture of a cation-exchange resin powder and cation-exchange fibers, or a mixture of an anion-exchange resin powder and an anion-exchange fibers is precoated, the precoated layer is too dense and so the pressure difference is very high, so that the object cannot be attained.

DISCLOSURE OF THE INVENTION

An object of the present invention is to overcome the drawbacks in the prior art and to provide a method of treating water by which the filtration lifetime of the precoating material is prolonged and by which the treated water can have better quality than that treated by the conventional method.

To practically prolong the lifetime of the precoating material, it is required that the precoated layer constituted by ion-exchanger(s) have an appropriate porosity and be not densified by pressure when water is passed through. To improve the quality of the treated water, it is required that the ion-exchanger(s) constituting the precoated layer have a large specific surface area and a large ion-exchange capacity so as to effectively adsorb ions and other impurities.

The present invention provides a method of treating water using a precoated filter which includes a precoating material coated on a support element, characterized in that said precoating material contains at least
   a) a cation-exchange resin in the form of powder,
   b) an anion-exchange resin in the form of powder, and
   c) ion-exchange fibers including an ion exchange polymer and a reinforcing polymer.

In the method of treating water according to the present invention, by employing ion-exchange fibers having a reinforcing polymer together with ion-exchange resin powders, a suitable porosity and compression strength are given to the precoated layer so that the lifetime of the precoating material is largely prolonged, and the quality of the treated water can also be improved by the excellent ion-exchanging property of the fibers with large surface area. This method is very convenient for which the conventional precoated filters can be utilized as they are, and yet the method is very effective.

By the method of the present invention, the reduction in the volume of the waste of the precoating material for treating water is enhanced. Further, in atomic power plants, in addition to the reduction of the waste, the exposure of the working staff in the plants to radioactivity can be largely reduced.

The water to be treated (raw water) by the method of the present invention is not restricted and any water which is treated by a precoated filter may be treated.

The method of the present invention is especially effective for the treatment of water to be used in, and waste water from the atomic power plants and steam power plants.

The water to be used in, and waste water from the atomic power plants and steam power plants includes condensate in circulation systems, fuel pool water, desalinator back wash waste water, vapor generation blowing water, drain water from moisture-water separators, cavity water, suppression pool water, core water and the like. Among these, the method of the present invention is especially effective for the treatment of the condensate generated in atomic power plants.

BEST MODE FOR CARRYING OUT THE INVENTION

In the present invention, ion-exchange fibers mean cation-exchange fibers and/or anion-exchange fibers.

The ion-exchange fibers used in the present invention are characterized in that they are fibers comprising an ion-exchange polymer and a reinforcing polymer. By virtue of the reinforcing polymer, the fibers have strength against either tension and compression, so that the densification by pressure of the precoated layer may effectively be prevented.

The mode of mixing the ion-exchange polymer and the reinforcing polymer is not restricted. For example, core-sheath type fibers which contain the ion-exchange polymer as the sheath component and the reinforcing polymer as the core component, multi-core mixed fibers and multi-core composite fibers may preferably be employed. Especially, the multi-core composite fibers are preferred because they have sufficient mechanical strength so that they are effective for preventing the densification by pressure of the precoating material and they have a large specific surface area as ion-exchanger.

If the content of the reinforcing polymer in the ion-exchange fibers is too small, the mechanical strength is low, while if the content of the reinforcing polymer is too large, the ion-exchange capacity or the adsorption capacity is decreased. Thus, the content of the reinforcing polymer in the ion-exchange fibers is preferably 10-70% by weight, more preferably 20-50% by weight.

The ion-exchange polymer used in the present invention is not restricted and include polymers of polystyrene-based, polyacrylic-based, polyamide-based, polyester-based, polyvinylalcohol-based, polyphenol-based and poly-α-olefin-based, to which ion-exchange groups are introduced. Among these, crosslinked insolubilized polystyrene-based polymers in which ion-exchange groups are introduced are preferred because they have excellent ion-exchange performance and chemical stability.

Examples of the reinforcing polymer include poly-α-olefins, polyamides, polyesters, acrylic-based polymers and the like, although the reinforcing polymer is not restricted thereto. Among these, in view of ease of production of the ion-exchange fibers, poly-α-olefins are preferred because of the excellent chemical resistance. Examples of poly-α-olefins include, although not restricted, polyethylenes, polypropylenes, poly-3-methylbutene-1, poly-4-methylpentene-1 and the like.

The diameter of the ion-exchange fibers may preferably be 15-100 μm (in dry state) for the prevention of the densification of the precoated layer. The diameter of the ion-exchange fibers may more preferably be 20-70 μm, still more preferably 30-50 μm.

To retain a suitable porosity in the precoated layer, the length of the fibers may preferably be 0.1-1 mm, more preferably 0.15-0.6 mm, still more preferably 0.2-0.4mm.

The shape of the cross-section of the fibers may be circular, oval, star-shaped or other various shapes.

The fibers may preferably be fibrillated for increasing the specific surface area so as to promote the ion-exchange capacity.

The ion-exchange fibers used in the present invention may be prepared by, for example, crosslinking and insolubilizing the polystyrene region of multi-core type mixed or composite fibers made of a polystyrene-based compound and a poly-α-olefin by formaldehyde source in the presence of an acid catalyst, and then introducing ion-exchange groups by a conventional method. Alternatively, the ion-exchange fibers may be prepared by, for example, impregnating poly-α-olefin fibers with styrene-divinylbenzene, and then introducing ion-exchange groups after copolymerization, or by introducing ion-exchange groups to outer surfaces of polyacrylonitrile fibers, polyamide fibers and polyester fibers by a chemical modification method or grafting method so as to prepare core-sheath type fibers. It should be noted that the preparation methods of the ion-exchange fibers to be used in the present invention are not restricted to those mentioned above.

To attain an appropriate porosity and densification by pressure-preventing ability in water, the ion-exchange fibers may preferably have a suitable range of hydration degree. This is because the hydration degree of the fibers largely influences the shape of the fibers in water.

It is necessary for improving the quality of the treated water that the ion-exchangers constituting the precoated layer have a large specific surface area and large adsorption capacity of impurities. The hydration degree of the ion-exchange fibers also largely influence the specific surface area and the adsorption capacity of the precoated layer. The hydration degree of the ion-exchange fibers may preferably 1.0-5.0. The hydration degree largely influences the volume and porosity of the ion-exchangers in water and also influences the adsorption ratio of impurities. In general, there is a tendency that the larger the hydration degree of an ion-exchanger, the larger the adsorption capacity of impurities.

The hydration degree is the value obtained according to the following equation:

$$\text{Hydration Degree} = (W - W_0)/W_0$$

wherein W represents the weight of Na type (or Cl type) cation (or anion) exchanger which was sufficiently immersed in deionized water and then the water on the surface thereof was removed therefrom by centrifugal dehydration and $W_0$ represents the weight of the same ion-exchanger which was completely dried.

If the dehydration degree is less than 1.0, the impurity-adsorption capacity of the ion-exchange fibers is decreased, so that the quality of the treated water is degraded and the volume and the porosity of the precoating material in water are made extremely small. As a result, the densification by pressure-preventing ability which is given by employing ion-exchange fibers is largely reduced, so that the pressure required for passing water through the filter is largely increased and the duration to reach the upper limit pressure is much shortened, thus the lifetime-prolonging effect is reduced.

Further, the fibers are rigid and the flexibility which is characteristic to fibers is degraded.

On the other hand, if the hydration degree is larger than 5.0, although the impurity-adsorption capacity of the ion-exchange fibers per se is increased, the volume and the porosity of the precoating material in water is even more increased, so that the fibers become the state like algae in water. Although this state is very effective for preventing the densification by pressure of the precoated layer, the impurities, especially ions in the water to be treated are likely to leak, so that the quality of the treated water may be degraded.

When the method of the present invention is used in treating condensate in atomic power plants or the like, since the leak of the impurities must be made extremely small, the hydration degree may more preferably be 1.0–3.0.

The hydration degree of the ion-exchange fibers may be controlled by various methods depending on the properties of the polymer forming the ion-exchange fibers. In case of polystyrene-based compounds, the hydration degree may be comparatively easily controlled within a considerably wide range by controlling the degree of the three-dimensional crosslinkage of the polystyrene moiety. In cases where the ion-exchange groups are introduced by chemical modification method or grafting method, the hydration degree may be controlled by changing the ratio of hydrophilic groups to hydrophobic groups by, for example, controlling the grafting ratio.

Treatment of the ion-exchange fibers after production thereof with hydrogen peroxide presents more advantageous effects. The hydrogen peroxide may preferably be in the form of an aqueous solution in normal water. The concentration of the hydrogen peroxide may preferably be 0.01–50% by weight, more preferably 0.1–20% by weight, and still more preferably 0.2–10% by weight. If the concentration of the hydrogen peroxide is too small, the effect by the surface treatment is not exhibited and if the concentration is too high, the ion-exchange groups may be decomposed, the physical strength of the fibers may be degraded and a long time is needed for the washing after the treatment.

The treatment with hydrogen peroxide is usually carried out at 5°–90° C., and may preferably be carried out at room temperature because of convenience. Further, the duration of the treatment is usually 0.5–500 hours, although it depends on the concentration of the hydrogen peroxide solution and temperature.

The treatment may be carried out by any appropriate method. Since hydrogen peroxide has a considerably high reactivity, the effect may be obtained by merely immersing the fibers in the solution with a volume in which the fibers can be just immersed.

By the fine bubbles generated in the solution and the oxidation reaction, the ion-exchange fibers treated with hydrogen peroxide are swelled and the surfaces of the fibers become slightly irregular and are edged, so that the specific surface area is made extremely large. Therefore, the active sites contributing to the ion-exchange or adsorption are enlarged and the hydration degree is also somewhat increased, so that the fibers acquire larger ion-exchange capacity.

On the other hand, the cation-exchange resin powder or anion-exchange resin powder used in the method of the present invention may preferably have a particle size of 1–250 μm, and those having an average particle size of not larger than 60 μm may more preferably be used. More particularly, for example, ion-exchange resin prepared by introducing ion-exchange groups into styrene-divinylbenzene copolymer which has excellent chemical stability and ion-exchange performance, or ion-exchange resin made of acrylic monomer-divinylbenzene copolymer, which is pulverized into powder, may be used.

The anion-exchange groups in the ion-exchange fibers and resin powder used in the present invention include strongly basic anion-exchange groups obtained by treating a haloalkylated compound with a tertiary amine such as trimethylamine, and weakly basic anion-exchange groups obtained by treating a haloalkylated compound with a primary or secondary amine such as diethylamine, piperazine, morpholine or the like. In view of the treatment performance, strongly basic anion-exchange resin is preferred in the present invention.

Preferred examples of the cation-exchange groups include sulfonic acid group, phosphonic acid group, carboxylic acid group and aminocarboxylic acid groups such as iminodiacetic acid group. Among these, sulfonic acid group is most preferred in view of the treatment performance.

The combination of the ion-exchange fibers and ion-exchange resin powders constituting the precoating material is required to be [Fc, Rc, Ra], [Fa, Rc, Ra], [Fc, Fa, Rc, Ra] or the like. In particular, for the treatment of the water to be used in, or waste water from atomic power plants, for which especially high standard is applied for the quality of the treated water, [Fc, Rc, Ra] is most preferred. Here, Fc and Fa mean cation- and anion-exchange fibers, respectively, and Rc and Ra mean cation- and anion-exchange resin powders, respectively.

In the present invention, the ratio of the ion-exchange fibers to the overall precoating material is preferably 10–60%, more preferably 15–50%, still more preferably 20–40% based on the dry weight. This is because that if the fiber content is too small, the effects for attaining the suitable porosity, for preventing the densification by pressure and for retaining high specific surface area are small, and on the other hand, if the fiber content is too large, although the lifetime is prolonged because the porosity of the precoated layer is made large, the quality of the treated water is degraded. It should be noted, however, in cases where the constitution of the precoating material is more precisely designed, the fiber content may be locally outside the above-mentioned range.

The ratio of cation-exchanger to anion-exchanger may preferably be in the range of 1/10–10/1, and for treating the water to be used in, or waste water from atomic power plants, the ratio may preferably be 1/1–10/1.

Examples of the methods of using the ion-exchangers as the precoating material include the following ①–④, although they are not restricted thereto.

① A method in which the cation- and anion-exchange resin powders and ion-exchange fibers are mixed under stirring in water to form a flock, or the cation- and anion-exchange resin powders are mixed under stirring in water and then ion-exchange fibers are mixed under stirring to form a flock, and the resulting flock is precoated in a single step by a conventional method. The thickness of the precoated layer is preferably 2–20 mm, more preferably 3–10 mm.

② Step (multiple) precoating method. In this method, the precoating of the precoating material on the element is carried out separately before and during the treatment of the raw water. It is known that when impurities are separated by filtration, inner filtration in which the impurities are diffused in the inner portion of the precoated layer and adsorbed therein first occurs and then surface filtration at the surface of the precoated layer, in which the impurities are captured by a densified surface cake formed on the surface of the precoated layer, which cake is made of the impurities and the precoating layer occurs. It is also known that the increase in the filtration pressure is moderate in the inner filtration but it is suddenly increased when the surface filtration begins. In this step precoating method, the filtering material precoated before the treatment of raw water captures the impurities by inner filtration, the passing of the water to be treated is once stopped when the surface filtration starts as the impurities are formed into the cake, and then fresh precoating material is precoated on the surface of the precoated layer. According to this method, since a second inner filtration is carried out by the fresh precoating material coated later, the duration of the inner filtration is prolonged if the same amount of precoating material is used.

The method of using the ion-exchangers as the precoating material is optional. For example, the cation- and anion-exchange resin powders and the ion-exchange fibers are mixed under stirring in water to prepare a flock, the cation- and anion-exchange resin powders are mixed in water under stirring and then ion-exchange fibers are mixed in water under stirring to prepare a flock, or the cation- and anion-exchange resin powders and ion-exchange fibers are mixed under stirring in water to prepare a flock and then additional ion exchange fibers are mixed under stirring in water to prepare a flock, and then the resulting flock is precoated in a plurality of steps.

The thickness of the precoated layer formed in the first step may preferably be 1.5–15 mm, more preferably 2–10 mm, and that of the precoated layer formed in the second step may preferably be 0.5–10 mm, more preferably 1–5 mm. This is because that if the precoated layer formed in the first step is too thin, the ratio of capture of the impurities in the initial step is decreased so that the quality of the treated water tends to be degraded, and if it is too thick, the thickness of the precoated layer formed in the second step is decreased, so that the advantageous effect obtained by the step precoating may not be obtained. The time point at which the second precoating is started may preferably be the time point at which the difference in the pressure exerted to each side of the filter is increased to 0.01–0.4 kg/cm$^2$, still more preferably 0.05–0.2 kg/cm$^2$ by passing the water through the filter. When the pressure difference reaches this point, the passing of the water is once stopped and the second precoating is carried out.

The number of the steps of precoating is not restricted to twice, and the precoating may be carried out in several steps. However, if the number of precoating steps is too many, the volume of the precoating material is increased or the quality of the treated water is degraded and so it is against the object of the present invention which is to prolong the lifetime of the precoated layer while keeping the amount of the waste precoating material as small as possible and to improve the quality of the treated water, so that the number of precoating steps is preferably twice or three times.

In this method, in addition to the effect brought about by the employment of the ion-exchange fibers, by the step precoating, the inner filtration is carried out in a plurality of layers, so that the duration of the inner filtration is prolonged and the increase in the pressure difference is delayed. It was found that these two effects are effectively exhibited without interfering each other, and a novel synergistic effect for greatly preventing the densification by pressure of the precoating material is presented. This is an effect brought about by the difference in the material distribution in the precoated layers under pressure.

③ An overcoat precoating method. In this method, a flock prepared by mixing the cation- and anion-exchange resin powders in water under stirring or a flock prepared by mixing the thus obtained flock with the ion-exchange fibers is precoated and then the ion-exchange fibers are precoated thereon. Thereafter, the water to be treated is passed. In this case, it is preferred to form the precoated layer such that the ratio of the ion-exchange fibers to the ion-exchange resin powders is decreased continuously or in stepwise in the direction of the passing of the water to be treated. The ratio of the ion-exchange fibers to the ion-exchange resin powders may preferably be 0–50% by weight, more preferably 20–40% by weight in the initial step of precoating the precoating material on the filter. The fiber content is gradually increased and in the outermost region of the precoated layer, which is formed finally, may preferably be 60–100% by weight, more preferably 80–100% by weight.

In a more preferred mode, the filtration layer made of the precoating material is separated into three layers and the outer layer (the layer which the water to be treated is first contacts when it passes through the filter) has a fiber ratio of 80–100% by weight, the central layer (central portion of the precoating material) has a fiber ratio of 40–80% by weight and the inner layer (the layer nearest to the element) has a fiber ratio of 0–40% by weight.

These layers may be clearly and discontinuously separated, or gradually separated such that the fiber ratio is continuously made smaller in the direction of passing of water.

The reason why such a precoated layer gives better results when compared with the conventional precoated layer with a uniform resin-fiber ratio is that the precoated layer is designed taking the kinds and nature of the impurities in the water to be treated into consideration. Particularly, in the treatment of the condensate generated in atomic power plants, the impurities in the water to be treated are mainly oxides of iron called crud. The crud is grouped into crystalline compounds and amorphous compounds and these have different properties. The crystalline compounds include $\alpha$-, $\gamma$-FeOOH, $Fe_3O_4$, $Fe_2O_3$ and the like and the amorphous compounds include $Fe(OH)_3$.

It is considered that in the filtration through the precoated layer, the amorphous iron is mainly filtered off by the electric adsorption by the cation-exchanger(s) in the flock, while the crystalline compounds are removed by volume filtration by the flock of the cation-exchanger(s) and anion-exchanger(s). The flock is not changed so much when it filters the crystalline components while the volume thereof is sharply decreased when it adsorbs the amorphous components. This is one of the major causes of the sharp increase in the pressure difference during the passing of water.

Although the content ratio of the iron forms in the crud varies depending on the portion of the water path in the water circuit in atomic power plants, it is known that the condensate moving from the condenser to the condensate-treating system has higher content of amorphous iron than other circulating water. Thus, it is necessary to form a precoated layer which can adsorb amorphous iron without reducing its volume and with which the impurities are not leaked.

In this method, by disposing a layer which is rich in ion-exchange fibers which give large porosity and which are hardly shrunk, which have also large specific surface area and excellent electric adsorption ratio, at the outer side of the precoated layer, the amorphous iron in the water to be treated is effectively adsorbed thereto, and the crystalline iron oxides are then filtered off by the ion-exchange resin/ion-exchange fiber layer with an appropriate porosity. The precoated layer is so designed that ions and other extremely small components do not leak since the filter layer is gradually densified in the direction of the passing of the water to be treated, and further the sharp increase in the pressure difference is delayed.

④ A body feed precoating method. In this method, for example, a flock prepared by mixing cation-exchange resin powder and anion-exchange resin powder are mixed in water under stirring or a flock prepared by mixing the thus obtained flock with ion-exchange fibers is precoated and then the ion-exchange fibers alone or a flock prepared by mixing the ion-exchange fibers with the cation-exchange and anion-exchange resin powders is contained in the water to be treated and is precoated simultaneously with the continuous or intermittent passing of the water to be treated.

Taking the practicality of the operation into consideration, it is preferred that the water to be treated contain the ion-exchange fibers alone. In this method, since the impurities in the water to be treated first contact the precoating material in free state and then form a layer, the duration of inner filtration can be made extremely long, so that the sharp increase in the pressure difference can effectively be delayed. Further, since the crud is taken into the entire volume of the precoating layer, 100% of the adsorption capacity of the precoated layer is consumed, so that this method is also very useful for improving the quality of the treated water.

Irrespective of the precoating method, the rate of passing of the water to be treated through the precoated layer is about 1-20 m/hr, and the pressure loss in water flow through the precoated layer reaches about 2 kg/cm$^2$, the passing of the water is stopped and back wash is carried out according to a conventional method. All of the precoated and back washed precoating material is discarded as a waste. The support is repeatedly used and fresh precoating material is precoated.

When only the ease of operation and administration of maintenance are taken into consideration, the single step precoating method by the conventional method is preferred. However, to prolong the lifetime of the precoating material longer (or the great reduction of the radioactive wastes), which is the object of the present invention, the step precoating method, overcoat precoating method and body feed precoating method are effective and preferred. Further, when the ion-exchangers are mixed under stirring, it is effective to add a surfactant.

No problems are brought about even if inert fibers having no ion-exchange groups are mixed in the precoating material. In particular, since the fibers of cellulose, polyacrylonitrile and the like with a diameter of 0.1-30 μm likely to get tangled each other, depending on the structure of the filter, they can prevent the leaking of the precoating material, so that better effect may be obtained.

As the precoat support, usual precoat filters of cylindrical or leave-shaped, as well as any of those employed in ion-exchange filters may be used, and the filter systems presently used can be employed as they are.

Examples of the present invention will now be described. It should be noted that the present invention is not restricted to the Examples.

EXAMPLE 1

Spun multi-core sea-and island type composite fibers [sea component(polystyrene)/island component (polyethylene)=50/50 (number of islands: 16)] are cut into 0.3 mm length to obtain cut fibers. One part of the cut fibers were added to a crosslinking and sulfonizing solution consisting of 7.5 parts by volume of commercially available first grade sulfuric acid and 0.07 part by weight of paraformaldehyde, and the resulting mixture was allowed to react for 4 hours at 90° C. and then for 3 hours at 100° C., followed by washing with water. The mixture was then treated with an alkali and then activated with hydrochloric acid to obtain cation-exchange fibers having sulfonic acid groups (exchange capacity 3.5 milliequivalents/g-Na, fiber diameter of about 40 μm).

The exchange capacity was measured by the following method:

In 50 ml of 0.1N sodium hydroxide, 1 g of the cut fibers are placed and the resultant was shaken for 2 hours. Five milliliter aliquots of the mixture were accurately measured and the exchange capacity was calculated from the results of neutralization titration.

The cut fibers which were converted to Na type were sufficiently immersed in deionized water and was dehydrated with a domestic centrifugal dehydrator. The weight (W) of the resulting fibers was measured. The fibers were then completely dried in a dryer at 60° C. for 48 hours and the weight ($W_0$) of the resulting fibers was measured. The hydration degree was determined by the following equation:

Hydration Degree = $(W - W_0)/W_0$

The hydration degree of the cation-exchange fibers obtained above was 1.6.

To a mixture of commercially available cation-exchange resin powder ["Powdex"-PCH (Japan Organo Co., Ltd.), having sulfonic acid groups, exchange capacity: 5.0 milliequivalents/g] and commercially available anion-exchange resin powder, [Powdex-PAO (Japan Organo Co., Ltd.) having trimethylammonium groups, exchange capacity: 3.2 milliequivalents/g], the ion-exchange fibers obtained above were added in the amount of 20%, 30% or 50% based on the total amount, adjusting the cation-exchanger/anion-exchanger ratio to 3/1 to obtain a cake of a flock. Five grams (dry weight) of this cake previously immersed in deionized water was packed in a column for measurement with a diameter of 24 mm. The cake was immersed with deionized water and was loaded from upper side to compress the cake. The thickness of the cake was measured so as to observe the state of the densification by pressure in the compressed state. The results are shown in Table 1.

Comparative Example 1

A cake of a flock was prepared in the same manner as in Example 1 except that the ion-exchange fibers are not mixed, and the same experiments as in Example 1 were carried out. The results are shown in Table 1.

Comparative Example 2

Cation-exchange fibers were prepared in the same manner as in Example 1 except that polystyrene fibers having no reinforcing polyethylene were used (exchange capacity: 5.0 milliequivalents/g-Na, fiber diameter: about 50 $\mu$m).

Although the fibers were brittle, they were subjected for the experiment. The same experiment as in Example 1 wherein the fiber content was 30% by weight was carried out. The results are shown in Table 1.

From these results, it was found that although the precoated layers in the Comparative Examples were voluminous, they were easily deformed by pressure, that the structure is strengthened by mixing ion-exchange fibers because the fibers act as nuclei, and that what was aggressively effective for the reduction of the compression ratio when the layer was compressed was the polyethylene which was the reinforcing material.

EXAMPLE 2

In deionized water, the cation-exchange fibers used in Example 1 were mixed with the ion-exchange resin powders used in Example 1 in the amount of 20%, 30% or 50% based on the total weight, so as to prepare flocks in which the ratio of cation-exchangers to anion-exchangers was adjusted to 6/1.

On a support plate made of an acrylic resin contained in a column (50 mm diameter), a filter paper was placed and the flock obtained above was stacked thereon to precoat the flock. The total weight of the flock was 1.96 g (about 1.0 kg/m$^2$). As for the system wherein the fiber ratio was 30% by weight, the thickness of the precoated layer was measured. The results are shown in Table 2. Thereafter, a formulated imitation solution containing 5 ppm (in terms of iron content) of amorphous iron (ferric hydroxide, average particle size of 3.6 $\mu$m) was passed through the precoated layer at a flow rate of 8 m/hr until the difference in pressure of each side of the filter reaches 1.75 kg/cm$^2$ which is the upper limit of the pressure difference for precoating material fixed by the Regulation for atomic power plants. From the results of the measurements of the filtration duration (lifetime of the precoating material) and the iron concentration, average iron-removal ratio was calculated. The results are shown in Table 3.

After passing of the water, the thickness of the precoated layer was measured for the system with a fiber ratio of 30% by weight. The results are shown in Table 2.

Comparative Example 3

A flock was prepared in the same manner as in Comparative Example 1 except that the ratio of cation-exchangers/anion-exchangers was 6/1, and the same experiment as in Example 2 was conducted. The results are shown in Tables 2 and 3.

Comparative Example 4

The same experiment as in Example 2 was carried out except that fibers obtained in Comparative Example 2 were used. The results are shown in Table 3.

From these results, it was found that mixing of the ion-exchange fibers containing a reinforcing material very effectively delays the increase in the pressure difference of the precoated layer.

EXAMPLE 3

Using a filter element made of SUS metal mesh with a diameter of 30 mm, length of 1500 mm and a filtering area of 0.14 m$^2$, single element-precoating test was carried out.

In deionized water, the cation-exchange fibers used in Example 1 were mixed with the ion-exchange resin powders used in Example 1 in the amount of 30% based on the total weight, so as to prepare flocks in which the ratio of cation-exchangers to anion-exchangers was adjusted to 6/1.

On a side of the above-mentioned element, the flock was precoated. The total weight of the flock was 142 g (about 1.0 kg/m$^2$). After completion of the precoating, a condensate (iron concentration: 10 ppb) was passed through at a flow rate of 8 m/hr until the pressure loss reaches about 1.80 kg/cm$^2$. From the number of days during which the water was passed (lifetime of the precoated layer) and the measured iron concentration, the change in the water quality was observed.

The results are shown in Table 4.

Comparative Example 5

Using a flock obtained in the same manner as in Comparative Example 3, the same experiment as in Example 3 was carried out. The results are shown in Table 4.

From these results, it can be seen that the mixing of the ion-exchange resin having a reinforcing material effectively serves to delay the increase in the pressure difference of the precoated layer and to improve the quality of the treated water, in the treatment of the condensate.

EXAMPLE 4

The same reaction as in Example 1 was repeated except that the amount of the paraformaldehyde was 0.03 part by weight, to obtain cation-exchange fibers having the following properties:

Hydration Degree: 2.5, Ion-exchange Capacity: 3.5 milliequivalents/g-Na, Fiber Diameter: about 40 $\mu$m Using the obtained cation-exchange fibers, the same experiment as in Example 2 was carried out.

The results are shown in Table 3.

EXAMPLE 5

The same reaction as in Example 1 was repeated except that the amount of the paraformaldehyde was 0.2 part by weight, to obtain cation-exchange fibers having the following properties:

Hydration Degree: 0.8, Ion-exchange Capacity: 3.5 milliequivalents/g-Na, Fiber Diameter: about 40 $\mu$m Using the obtained cation-exchange fibers, the same experiment as in Example 2 was carried out.

The results are shown in Table 3.

EXAMPLE 6

The same reaction as in Example 1 was repeated except that the amount of the paraformaldehyde was 0.01 part by weight, to obtain cation-exchange fibers having the following properties:

Hydration Degree: 6.0, Ion-exchange Capacity: 3.5 milliequivalents/g-Na, Fiber Diameter: about 40 $\mu$m Using the obtained cation-exchange fibers, the same experiment as in Example 2 was carried out.

The results are shown in Table 3.

From these results, it can be seen that when the hydration degree of the ion-exchange fibers is in the range of 1.0–5.0, the mixing of the ion-exchange fibers presents a well balanced effects of promoting the quality of the treated water and of prolonging the lifetime of the precoated layer. It can be seen that if the hydration degree is too small, a sharp increase in the pressure difference occurs so that the effect of mixing the ion-exchange fibers is not exhibited, and the impurity-adsorbing capacity of the ion-exchange fibers is low, so that the quality of the treated water is degraded. On the other hand, if the hydration degree is too large, the porosity of the ion-exchangers is too large, so that the impurities leak to prominently degrade the quality of treated water.

Even within the acceptable range of hydration degree of 1.0–5.0, the balance of the effects varies, so that it is necessary to select ion-exchange fibers with the optimum hydration degree depending of the properties of the water to be treated.

EXAMPLE 7

The cation-exchange fibers obtained in Example 1 in the amount of 0.125 g (dry weight) was placed in a flask together with 25 ml of a 100 ppm aqueous solution of amorphous iron (ferric hydroxide, average particle size of 3.6 $\mu$m) and the mixture was shaken for 2 hours. Thereafter, the mixture was filtered through a G1 glass filter and absorbance of the filtrate was measured. By comparing the absorbance of the filtrate at a wavelength of 550 nm with that of the raw liquid, the adsorption ratio of the amorphous iron was determined.

Thereafter, 20 g (dry weight) of the cation-exchange fibers obtained in Example 1 was immersed in 200 ml of 5% aqueous solution of hydrogen peroxide at room temperature for 90 hours. The resulting fibers were then well washed with pure water to obtain cation-exchange fibers treated with hydrogen peroxide. The measured hydration degree and exchange capacity were 1.9 and 3.5 milliequivalents/g-Na, respectively.

The adsorption ratio of the amorphous iron of the thus treated cation-exchange fibers was measured in the same manner as in the measurement of that of the ion-exchange fibers before the treatment. The results are shown in Table 5.

From the results showing that the adsorption ratio of the amorphous iron was raised without change in the exchange capacity, it was found that the ion-exchange fibers treated with hydrogen peroxide have considerably larger specific surface area than the ion-exchange fibers which were not treated.

EXAMPLE 8

To the ion-exchange resin powders used in Example 1, the cation-exchange fibers treated with hydrogen peroxide obtained in Example 12 was added in the amount of 30% based on the total weight, and the ratio of cation-exchangers to anion-exchangers was adjusted to 6/1.

Using the thus obtained flock, the same experiment as in Example 2 was carried out.

The results are shown in Table 3.

From these results, it was found that by treating the ion-exchange fibers with hydrogen peroxide, the specific surface area of the fibers is increased and the ion-exchange performance is improved, so that the effect as a precoating material is promoted. It is considered that this is because that the fibers swell because of the fine bubbles generated in the aqueous hydrogen peroxide solution and of the oxidation reaction and the surface is edged, so that the specific surface area is increased very much, resulting in the enlargement of the active sites contributing to the ion-exchange or adsorption.

EXAMPLE 9

The same flock as in Example 2 with a fiber ratio of 30% by weight was prepared.

On a support plate made of an acrylic resin contained in a column (50 mm diameter), a filter paper was placed and 1.36 g (about 70% of the total weight) of the flock obtained above was stacked thereon to precoat the flock. The thickness of the resulting cake was measured. The results are shown in Table 2.

Thereafter, a formulated imitation solution containing 5 ppm (in terms of iron content) of amorphous iron (ferric hydroxide, average particle size of 3.6 $\mu$m) was passed through the precoated layer at a flow rate of 8 m/hr, and the duration of the filtering, iron concentration and the pressure difference were measured. Upon the pressure difference reaches about 0.1 kg/cm$^2$, the passing of the water was once stopped, and the remaining 0.6 g of the flock (about 30% of the total weight) was precoated on the firstly precoated layer. The thickness of the second cake was measured at this time. The results are shown in Table 2. The imitation solution was again passed at a flow rate of 8 m/hr until the difference in pressure exerted to each side of the filter reaches about 1.8 kg/cm$^2$ which is the upper limit of the pressure difference for precoating material fixed by the Regulation for atomic power plants. From the results of the measurements of the filtration duration (lifetime of the precoating material) and the iron concentration, average iron-removal ratio was calculated. The results are shown in Table 3.

After the experiment, the used cake was taken out retaining its shape and the thickness thereof was measured so as to check the degree of densification by pressure. The results are shown in Table 2.

Comparative Example 6

A cake of a flock was prepared in the same manner as in Example 9 except that ion-exchange fibers were not mixed, and the same experiment as in Example 9 was conducted.

The thickness of the first and second cakes before the treatment of the raw liquid was measured. The results are shown in Table 2.

From the results of the measurements of the filtration duration (lifetime of the precoating material) and the iron concentration, average iron-removal ratio was calculated. The results are shown in Table 3.

From these results, it can be seen that by mixing the ion-exchange fibers, the quality of the treated water is improved and by employing the step precoating method, by virtue of the prolongation of the duration of inner filtration, the lifetime of the precoating material is prolonged. It can also be seen that these effects are well exhibited without interfering each other, and the effect of preventing the densification by pressure is exhibited by employing the step precoating method, which is not at all presented in the systems employing resin powders alone. Thus, it was found that the step precoating method is very effective for the prolongation of the lifetime of the precoating material and for the improvement of the quality of water.

EXAMPLE 10

The cation-exchange fibers and resin powders used in Example 1 were mixed in the ratio shown in Table 6. The overall ratio of the cation-exchangers to anion exchangers was adjusted to 6/1 and the overall content of the ion-exchange fibers was adjusted to 30% based on the total weight of the precoating material.

The total weight of the flock was 2.00 g (about 1.0 kg/m$^2$).

On a support plate made of an acrylic resin placed in a column (50 mm diameter), a filter paper was placed. On this filter paper, flocks with fiber ratios of 20%, 60% and 90% were sequentially stacked in the order mentioned so as to precoat the flocks.

After completion of the precoating, the same experiment as in Example 2 was carried out.

The experimental results are shown in Table 3.

EXAMPLE 11

The cation-exchange fibers and resin powders used in Example 1 were mixed in the ratio shown in Table 7. The overall ratio of the cation-exchangers to anion exchangers was adjusted to 3/1 and the overall content of the ion-exchange fibers was adjusted to 50% based on the total weight of the precoating material.

The total weight of the flock was 2.60 g (about 1.3 kg/m$^2$).

The flocks with fiber ratio of 30% and 100% were sequentially stacked in this order to precoat the flocks.

After completion of the precoating, the same experiment as in Example 2 was carried out.

The experimental results are shown in Table 3.

EXAMPLE 12

Ion-exchange resin powders and ion-exchange fibers, each of which weight was the same as in Example 11, were separately formulated into slurries in the form of layers. Each of the slurries was then fed to a column using separate pumps. The rates of the feeding of the slurries by the pumps were adjusted such that the flow rate of the slurry of the resin powders is gradually decreased and the flow rate of the slurry of the fibers is gradually increased. The pumps were operated simultaneously. The output of the pump feeding the powder slurry was so adjusted that it takes 30 minutes to feed the entire slurry and that of the pump feeding the fiber slurry was so adjusted that it takes 40 minutes to feed the entire slurry.

A precoated layer in which the fiber ratio is continuously changed by the method described above, which contains the same amount of the fibers and powders as in Example 11 was thus prepared. Using the thus prepared precoated layer, the same experiment as in Example 11 was carried out. The results are shown in Table 3.

From these results, it can be seen that changing the mixing ratio of the ion-exchange fibers and ion-exchange resin powders within the precoated layer gives great effects for delaying the sharp increase in the pressure difference and for the improvement of the treated water. This is presumably because that good balance as the precoated layer is exhibited such that the shrinkage of the precoated layer by the adsorption of the amorphous iron is prevented by the ion-exchange fibers-rich layer and the crystalline iron and the ions leaking from the upper layer are effectively adsorbed by the ion-exchange resin powder-rich layer which is gradually densified in the direction of passing of the water.

EXAMPLE 13

The cation-exchange resin powder and the anion-exchange resin powder used in Example 1 were mixed in pure water to form a flock. The ratio of cation-exchanger/anion-exchanger was 3/1 and the weight of the mixture was 1.37 g. The thus obtained flock was then precoated on a column in the same manner as in Example 2. Thereafter, a tank containing the cation-exchange fibers used in Example 2 dispersed in water and a tank containing an imitation solution having 5 ppm (in terms of iron content) of amorphous iron (ferric hydroxide, average particle size of 3.6 μm) were provided.

Using the same apparatus used in Example 12, the amorphous iron solution was fed to the column at a rate of 8 m/hr and simultaneously the fiber dispersion was fed to the column using another pump so as to attain a concentration of the ion-exchange fibers in the water to be treated of about 10 ppm, thereby carrying out a body feed treatment. The passing of the water was continued until the difference in pressure exerted to each side of the filter reaches 1.75 kg/cm$^2$ which is the upper limit of the pressure difference for precoating material fixed by the Regulation. From the results of the measurements of the filtration duration (lifetime of the precoating material) and the iron concentration, average iron-removal ratio was calculated. The results are shown in Table 3.

From these results, it was found that by the method of precoating the material by body feed combining the ion-exchange resin powders and ion-exchange fibers, the ion-exchange capacity is effectively utilized, so that it is very effective for prolonging the lifetime of the precoating material and improving the treated water.

TABLE 1

|  | Fiber Content (%) | Thickness of Cake (mm) Load (kg/cm$^2$) | | | | |
| --- | --- | --- | --- | --- | --- | --- |
|  |  | 0 | 0.1 | 0.2 | 0.3 | 1.0 |
| Example 1 | 20 | 62 | 40 | 32 | 29 | 28 |
|  | 30 | 63 | 40 | 33 | 30 | 29 |
|  | 50 | 61 | 43 | 35 | 34 | 33 |
| Comparative Example 1 | 0 | 63 | 36 | 22 | 20 | 19 |
| Comparative Example 2 | 30 | 65 | 38 | 25 | 23 | 21 |

TABLE 2

|  | Thickness of Precoated Layer (mm) | |
| --- | --- | --- |
|  | Immediately after Precoating | After Passing Water to be Treated |
| Example 2 | 5.2 | 4.2 |
| Comparative Example 3 | 4.8 | 3.3 |
| Example 9 | 3.5 + 1.7 | 4.7 |
| Comparative Example 6 | 3.1 + 1.5 | 3.2 |

TABLE 3

|  | Fiber Content (%) | Water Content | Lifetime of Precoated Layer (min.) |
| --- | --- | --- | --- |
| Example 2 | 20 | 1.6 | 120 |
|  | 30 | 1.6 | 150 |
|  | 50 | 1.6 | 160 |
| Comparative Example 3 | 0 | — | 80 |
| Comparative | 30 | — | 90 |

TABLE 3-continued

| Example 4 | | | |
|---|---|---|---|
| Example 4 | 30 | 2.5 | 180 |
| Example 5 | 30 | 0.8 | 100 |
| Example 6 | 30 | 6.0 | 240 |
| Example 8 | 30 | 1.9* | 190 |
| Example 9 | 30 | 1.6 | 240 |
| Comparative Example 6 | 0 | — | 100 |
| Example 10 | 20 · 60 · 90 (30% as Overall Percentage) | 1.6 | 240 |
| Example 11 | 30 · 100 (50% as Overall Percentage) | 1.6 | 310 |
| Example 12 | 0 → 100 (50% as Overall Percentage) | 1.6 | 320 |
| Example 13 | 30 | 1.6 | 260 |

| | Average Iron-removal Ratio (%) | Method of Precoating | Amount of Precoating (g) |
|---|---|---|---|
| Example 2 | 98 | Single Step | 1.96 |
| | 98 | Single Step | 1.96 |
| | 95 | Single Step | 1.96 |
| Comparative Example 3 | 95 | Single Step | 1.96 |
| Comparative Example 4 | 96 | Single Step | 1.96 |
| Example 4 | 96 | Single Step | 1.96 |
| Example 5 | 93 | Single Step | 1.96 |
| Example 6 | 91 | Single Step | 1.96 |
| Example 8 | 99 | Single Step | 1.96 |
| Example 9 | 98 | Multi-step | 1.96 |
| Comparative Example 6 | 91 | Multi-step | 1.96 |
| Example 10 | 98 | Overcoat | 2.0 |
| Example 11 | 97 | Overcoat | 2.6 |
| Example 12 | 96 | Overcoat | 2.6 |
| Example 13 | 99 | Body Feed | 2.05 |

*$H_2O_2$ - treated Fibers

TABLE 4

| Filtration Time (Day) | 1 | 10 | 20 | 30 | 40 | 50 | 60 |
|---|---|---|---|---|---|---|---|
| Example 3 | | | | | | | |
| Pressure Difference in Filtration (kg/cm$^2$) | 0.40 | 0.40 | 0.40 | 0.50 | 0.70 | 0.85 | 1.75 |
| Water Quality at Outlet, Iron Concentration (ppb) | 0.18 | 0.40 | 0.45 | 0.53 | 0.62 | 1.00 | 1.00 |
| Comparative Example 5 | | | | | | | |
| Pressure Difference in Filtration (kg/cm$^2$) | 0.45 | 0.50 | 1.15 | 1.80 | — | — | — |
| Water Quality at Outlet, Iron Concentration (ppb) | 0.18 | 2.00 | 1.80 | 1.65 | — | — | — |

TABLE 5

| $H_2O_2$ Treatment | Exchange Capacity (meq/g) | Water Content | Amorphous Iron Adsorption Ratio (%) |
|---|---|---|---|
| Before | 3.5 | 1.6 | 56.0 |
| After | 3.5 | 1.9 | 86.7 |

TABLE 6

| | Fiber Content in Each Layer (%) | Amount of Fiber (g) | Amount of PCH (g) | Amount of PAO (g) | Total Weight of Each Layer (g) | Weight of Layer/Total Weight (%) |
|---|---|---|---|---|---|---|
| First Layer | 90 | 0.09 | 0 | 0.01 | 0.1 | 5 |
| Second Layer | 60 | 0.198 | 0.092 | 0.04 | 0.33 | 16.5 |
| Third Layer | 20 | 0.314 | 1.022 | 0.280 | 1.57 | 78.5 |
| Total Amount | | 0.601 | 1.114 | 0.285 | 2.00 | |

TABLE 7

| | Fiber Content in Each Layer (%) | Amount of Fiber (g) | Amount of PCH (g) | Amount of PAO (g) | Total Weight of Each Layer (g) | Weight of Layer/Total Weight (%) |
|---|---|---|---|---|---|---|
| First Layer | 100 | 0.743 | 0 | 0 | 0.743 | 28.6 |
| Second Layer | 30 | 0.557 | 0.65 | 0.65 | 1.857 | 71.4 |
| Total Amount | | 1.3 | 0.65 | 0.65 | 2.60 | |

INDUSTRIAL APPLICABILITY

As described above, by the method of treating water according to the present invention, the lifetime of the precoating material is largely prolonged and the quality of the treated water is much improved when compared with that obtained by the conventional method presently used, so that the method of the present invention is an epoch making method.

Since the apparatuses and the systems presently used can be used as they are, the method of the present invention may be applied to any of the liquid treatments in which a precoat filter is used. The method of the present invention is especially effective for the treatment of water to be used in, or waste water from the atomic power plants and steam power plants.

The water to be used in, and waste water from the atomic power plants and steam power plants includes condensate in circulation system, fuel pool water, desalinator back wash waste water, vapor generation blowing water, drain water from moisture-water separator, cavity water, suppression pool water, core water and the like. Among these, the method of the present invention is especially effective for the treatment of the condensate generated in atomic power plants, for which the severest standard is applied.

We claim:

1. A method of treating water using a precoated filter which includes a precoating material coated on a support element comprising:
   a) forming a coating on said support element by
      i) applying a cation-exchange resin in the form of power to the support element,
      ii) applying anion-exchange resin in the form of power to the support element, iii) applying ion-exchange fibers each of which includes an ion exchange polymer having a reinforcing polymer to the support element, and b) passing water through the resins, the fibers and the support element.

2. The method of treating water according to claim 1, wherein said ion-exchange fibers have a hydration degree of 1.0–5.0.

3. The method of treating water according to claim 1, wherein said ion-exchange fibers are cation-exchange fibers.

4. The method of treating water according to claim 1, wherein said ion-exchange fibers have surfaces treated with hydrogen peroxide.

5. The method of treating water according to claim 1, wherein said precoating material further comprises inert fibers.

6. The method of treating water according to claim 1, wherein coating of said precoating material on said support element is carried out separately before the treatment of water and during the treatment of water.

7. The method of treating water according to claim 1, wherein said precoating material is coated such that the ratio of said ion-exchange fibers to the total of said cation-exchange resin powder and said anion-exchange resin powder is decreased continuously or stepwise in the layer of said precoating material in the direction of passing of the water to be treated.

8. The method of treating water according to claim 1, wherein at least said cation-exchange resin powder and said anion-exchange resin powder are first coated on said support element and thereafter at least said ion-exchange fibers are introduced into said precoated filter together with the water to be treated.

9. The method of treating water according to claim 1, wherein said cation-exchange resin powder, said anion-exchange resin powder and said ion-exchange fibers are coated on said support element in a mixture.

10. The method of claim 1 wherein said cation-exchange resin and said anion-exchange resin are mixed in water to form a flock and the flock is applied to the support element.

11. The method of claim 1 wherein said cation-exchange resin, said anion-exchange resin and said ion exchange fibers are mixed in water to form a flock and the flock is applied to the support element.

12. The method of claim 1 wherein said cation-exchange resin and said anion-exchange resin are mixed in water to form a flock and the flock is applied to the support element and the ion-exchange resin is then applied to the support element.

* * * * *